T. TAYLOR.
Casting Wheels.
No. 198,707.  Patented Dec. 25, 1877.
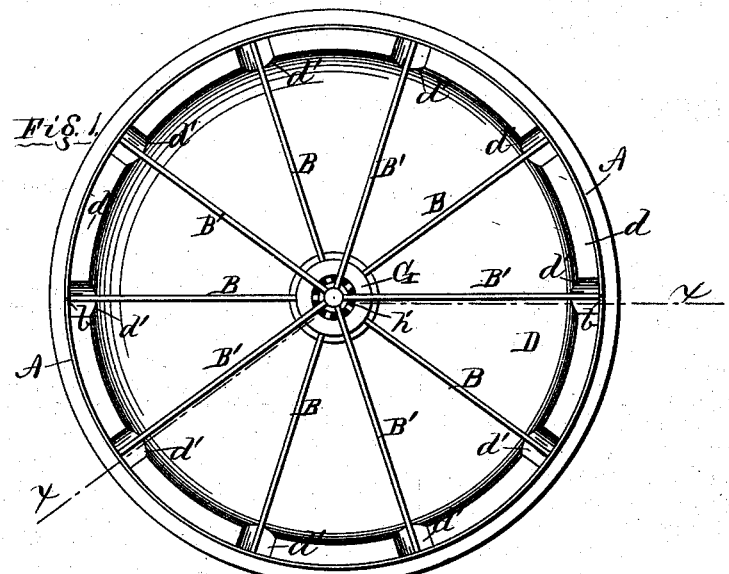
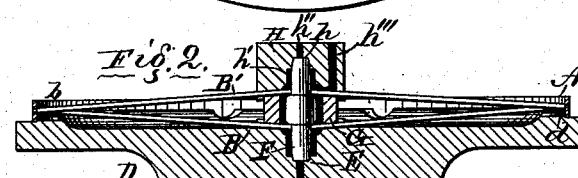
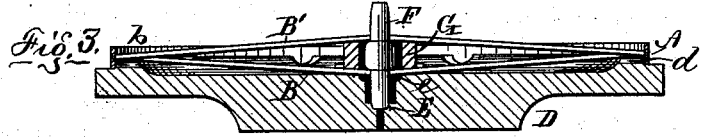
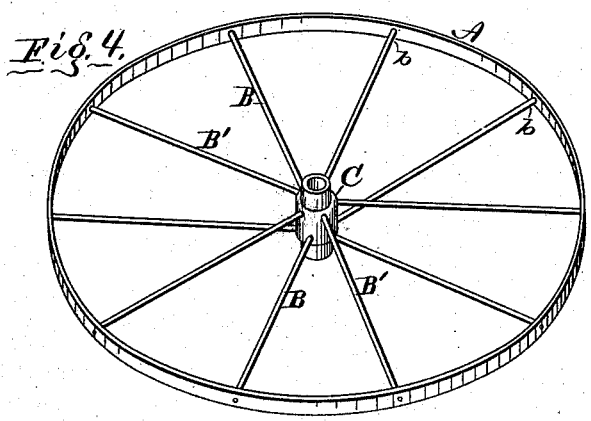
Witnesses:
Harry M. Richards
M. H. Barringer
Inventor:
Thomas Taylor,
By W. B. Richards,
Atty.

UNITED STATES PATENT OFFICE.

THOMAS TAYLOR, OF CANTON, ILL., ASSIGNOR TO PAGE MANUFACTURING COMPANY, OF SAME PLACE.

IMPROVEMENT IN CASTING WHEELS.

Specification forming part of Letters Patent No. 198,707, dated December 25, 1877; application filed June 30, 1877.

*To all whom it may concern:*

Be it known that I, THOMAS TAYLOR, of Canton, in the county of Fulton and State of Illinois, have invented certain new and useful Improvements in Manufacturing Vehicle-Wheels; and do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to improvements in the art of manufacturing wheels having wrought-metal rim and spokes and cast-metal hub cast upon the spokes while they are seated in place in the rim; and the invention consists in improvements in the process of uniting the hubs, spokes, and rim, and in the apparatus used, all as hereinafter fully described, and set forth in the claims hereto annexed.

Heretofore, in manufacturing wheels having wrought-metal spokes and rim and cast-metal hub, the spokes have been inserted in place in the rim, and the hub then cast or molded upon the inner adjacent ends of the spokes while the rim was cold, and the result has been that the hub in shrinking by cooling has either drawn the shouldered spokes from the fellies or rim, or else drawn the portion of the rim where each was attached thereto inward, and destroyed the circular shape of the wheel. To preserve the circular form of the wheel, and prevent withdrawal of the shoulders of the spokes from the inner side of the wheel-rim by the cooling and shrinking of the cast hub, is the prime object of my invention, and is accomplished by heating the rim and inserting the spokes and casting the hub while the rim remains heated, so that its shrinkage will correspond with the shrinkage of the hub, and thus prevent any withdrawal of the spokes from the rim by the cooling hub.

Figure 1 in the accompanying drawing is a top-plan view, showing the rim and spokes of a wheel in place on my improved device, and ready for applying the top or cope previous to casting the hub. Fig. 2 is a vertical sectional view of Fig. 1 in the line $x\ x$, and of the cope in place. Fig. 3 is a vertical sectional view of Fig. 1 in the line $x\ x$. Fig. 4 is a perspective view of a completed wheel.

Referring to the parts by letters, A is the wrought-metal rim, B B' the wrought-metal spokes, and C the cast-metal hub, of a wheel. D is a base or foundation, for supporting the parts of the wheel and the mold for forming the hub. It may be constructed of any suitable material, and is provided with an annular flange, $d$, on its upper face, which flange is of about the same diameter as the rim A, and has grooves $d'$ cut in its upper surface. The center of the base D has a recess or core-print, E, to receive a stand-core, F, and is enlarged at $e$ to form an annular space for the metal to form the hub. G is an annular-shaped mold, constructed of sand, the diameter of its central opening enough larger than the diameter of the core F to leave space for the hub C, and is grooved in its upper and lower ends, for the reception of the spokes B. H is the cope or top part of the mold, and is constructed, as plainly shown at Fig. 2, with grooves, which fit over the spokes B, with a recess, $h$, to receive and hold the upper end of the core F, with an annular space, $h'$, for the hub, with an ingate, $h''$, through which the metal is poured, and a vent, $h'''$.

The wheel represented in the drawing is of that class having "staggered" spokes, or spokes set bracing, one set, B, to another set, B'.

In constructing this wheel, I first heat the rim A, and place it over the flange $d$. The core F is then placed in its seat E, and the lower series of spokes B inserted in alternate holes in the rim A, with the shoulders $b$ on their outer ends resting against the rim A, and with their inner ends resting against the core F, and serving as chaplets to hold the core in position. The mold G is now put in place, and then the spokes B inserted in the rim A, and their inner ends resting in the grooves in the upper portion of the mold G, and against the upper end of the core F. The cope H is now placed in position, and the metal poured through the ingate $h''$, to form the hub C, and secure the spokes B B' by the metal cast around them. The cope H, core F, and box G may then be removed, and, if the operation is performed while the rim A remains hot, the shrinkage of the hub C and rim A will be such as to preserve the relative positions of the spokes thereto, and thus prevent the shrinking of the hub withdrawing the shoulders $b$ of the spokes from the rim.

The cope H, mold G, and base D should be made to fit snugly over the spokes, where they receive them, to prevent escape of metal in molding.

Having thus described my invention, what I claim as new, and desire to secure by Letters Patent, is—

1. The process of forming wheels having cast-metal hubs and wrought-metal spokes and rims, which consists in casting the hub upon the spokes while their outer ends are seated in the heated rim, substantially as described, and for the purposes set forth.

2. The combination of the base D, having an annular flange, $d$, for retaining the rim in place, with the core F, mold G, and cope H, substantially as described, and for the purpose specified.

In testimony that I claim the foregoing as my own I affix my signature in presence of two witnesses.

THOMAS TAYLOR.

Witnesses:
 G. K. BARRERE,
 D. BEESON.